United States Patent [19]

Nordblad et al.

[11] 4,040,269
[45] Aug. 9, 1977

[54] APPARATUS FOR CONTINUOUSLY COOLING WIRE SHAPED OBJECTS

[75] Inventors: Sven Sigurd Nordblad, Spanga; Karl-Erik Svensson, Hagersten, both of Sweden

[73] Assignee: Telefonaktiebolaget L M Ericsson, Stockholm, Sweden

[21] Appl. No.: 631,530

[22] Filed: Nov. 13, 1975

[30] Foreign Application Priority Data

Dec. 2, 1974 Sweden .................................. 7415044

[51] Int. Cl.² ............................................. F25D 17/02
[52] U.S. Cl. ................................... 62/374; 134/64 R; 134/102; 134/122 R
[58] Field of Search ...................... 62/63, 64, 374, 375; 266/45, 65; 72/201; 164/89, 283 S; 134/102, 122 R, 122 P, 64 R, 64 P

[56] References Cited

U.S. PATENT DOCUMENTS

| 2,287,825 | 6/1942 | Postlewaite | 62/63 X |
| 2,880,739 | 4/1959 | Popp | 134/64 R |
| 2,919,706 | 1/1960 | Williams | 134/64 R X |
| 3,339,373 | 9/1967 | Mobius et al. | 62/64 |
| 3,659,428 | 5/1972 | Kunioka et al. | 62/64 |

FOREIGN PATENT DOCUMENTS 1,232,940  6/1971  United Kingdom .................. 62/374

Primary Examiner—Ronald C. Capossela
Attorney, Agent, or Firm—Hane, Sullivan & Spiecens

[57] ABSTRACT

An apparatus for cooling plastic sheathed wires after the sheathing operation comprises two concentric tubes where the compartment between the tubes acts as a manifold for numerous nozzles directing jets of compressed air into the inner tube. A water stream flows along the inner wall of the inner tube and the water is atomized when passing the nozzles. The water mist formed is given a turbulent motion by the air jets causing an efficient cooling of the plastic sheath.

9 Claims, 3 Drawing Figures

APPARATUS FOR CONTINUOUSLY COOLING WIRE SHAPED OBJECTS

The present invention relates to apparatus for cooling wire shaped objects and particularly for cooling plastics sheathed electric wires immediately after the sheathing operation. An object of the present invention is to provide apparatus for achieving a quick cooling of the more or less viscous plastics after the sheathing operation. Another object of the invention is to provide cooling apparatus which demands considerably less floor area than earlier known devices.

The most common method to apply a thermoplastic cover on electric wires is by extrusion. The plastics material is fed by means of a worm through a heated cylinder where the material is heated to an appropriate temperature at the same time as the material is compressed and forced through suitably designed nozzles at one end of the cylinder in order to be extruded over the conductor which passes an extruder head at an appropriate speed. When the conductor has passed the head the extruded plastics is still viscous and must be cooled immediately in order to quickly obtain mechanical strength.

In heretofore known arrangements of this kind the cooling is mostly performed in horizontal basins through which the conductor passes while being sprinkled with water. It is a known phenomenon that water when moving along the wire forms a stagnant film on the surface thereof. Certainly this film takes heat from the plastics but, due to the low circulation in the layer that is nearest the surface of the conductor, a quick removal of the transferred heat is prevented. Efforts have been made to improve the cooling by using directed water jets and thus try to break the water film, but, because of the fact that the conductor runs in water, very strong jets are required which might, among other things, deform the not yet solidified plastic sheath.

A further disadvantage of the described cooling method is that its efficiency is highly dependent on the temperature of the cooling water which may vary much with the season. Effective cooling arrangements and insulation of the piping are required to make it possible to keep an even coolant temperature causing high investment — and operating costs. Due to the fact that extruding of the conductor wire can be performed at a relatively high speed the cooling basins will also be relatively long in order to have the conducting wire sufficiently cooled when it leaves the cooling basin. Because the cooling basins are horizontal they occupy a considerable floor-area. When starting a line for sheathing electric wires with plastics where cooling is performed in a cooling basin according to the present state of the art, the starting end of the wire has to be pulled manually along the whole length of the cooling basin. Such pulling is a difficult and time-wasting operation.

This invention which relates to a cooling arrangement not having the above-discussed disadvantages has characteristics which appear from the appended claims.

The invention will be described more in detail with reference to the appended drawings where:

Figure 1:
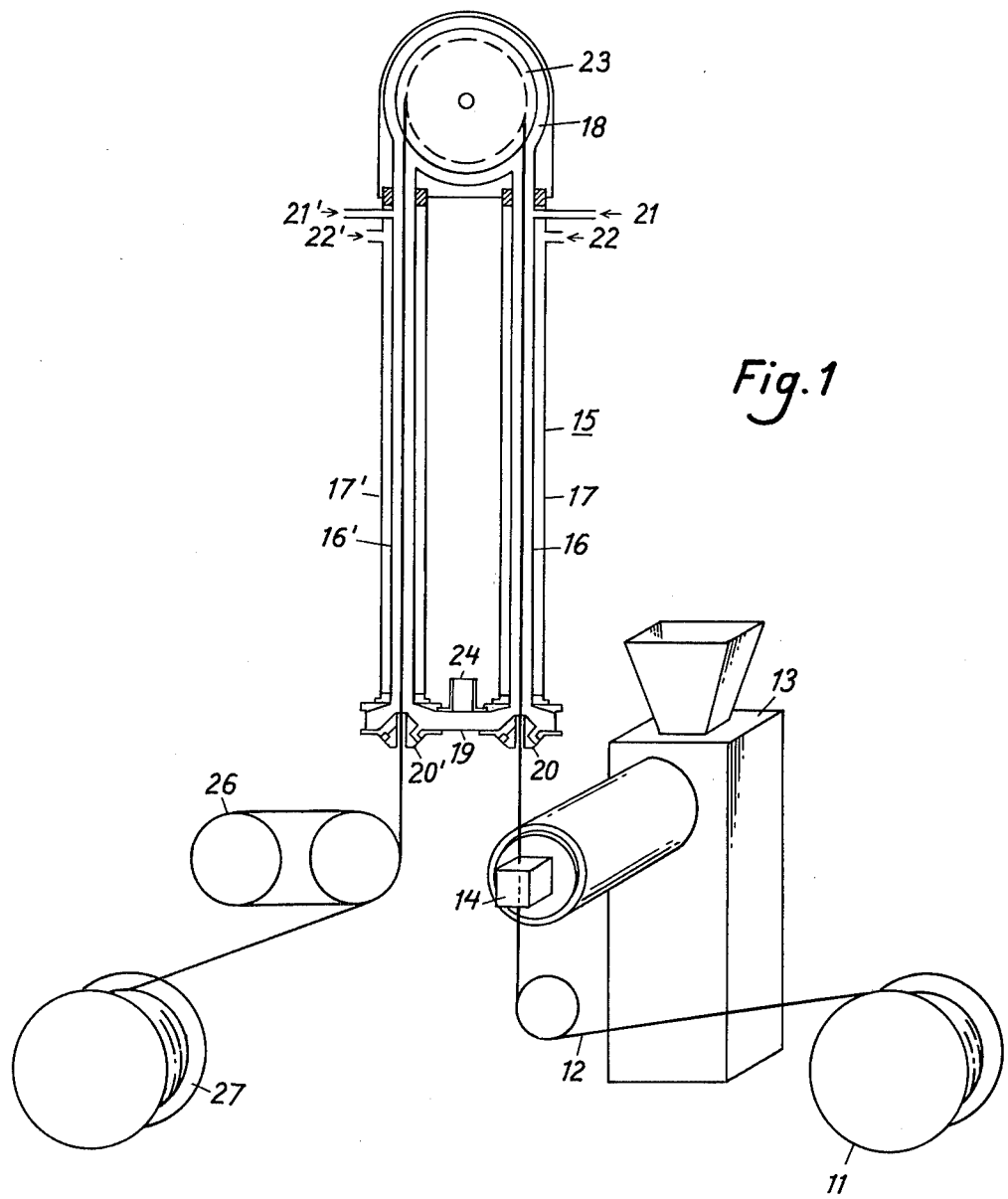
FIG. 1 shows a principle outline of a plant for plastic sheathing provided with a cooling arrangement according to the invention.

In FIG. 1 the reference numeral 11 denotes a supply coil, for instance, for copper wire 12. The wire 12 passes through an extruder head 14 of an extruder 13 where the wire is sheathed with thermoplastic material. When leaving the extruder head 14 the thermoplastic sheath of the wire 12 is still viscous and must be cooled as soon as possible in order not to be deformed. In direct connection with the extruder head 14 there is a generally vertically disposed cooling arrangement through which the wire passes. The cooling arrangement 15 mainly consists of two concentric pipes 16, 17 where the wire passes upwards through the inner pipe 16. The concentric pipe is folded so that the wire in the section 16', 17' then passes in a downward direction. The mouths 20, 20' of the cooling pipes placed in the same horizontal plane and the inner pipes 16, 16' are there attached to a sump 19. At the bending point the inner pipes 16, 16' are connected to a house 18 in which a pulley 23 is placed.

Cooling water is provided to the inner pipe 16, 16' through the connections 21, 21' in such a way that a stream of water trickles along the pipewall. As will be shown hereinafter it is convenient to supply water at several places along the pipes 16, 16'. The outer pipe 17, 17', the ends of which are closed, is connected to a compressed air supply in a similar manner by means of the connections 22, 22'. The inner pipe 16, 16' is connected to the outer pipe by means of a great number of nozzles through which air jets are blown into the inner pipe. The air jets atomize the water layer trickling along the pipe wall into a water mist. Thus the pipe is filled with a mixture of air and water mist which by influence of the air jets is constantly circulating. The inner pipes 16, 16' are connected to the sump 19 having a vent 24 open to the atmosphere. When the compressed air leaves the nozzles it expands causing a drop in temperature. The quantity of escaping air, the design and number of the nozzles are selected in such a way that the temperature of the water mist is close to the freezing point. When the water mist meets the hot wire near the inlet 20 the water is vaporized and the heat required for the vaporization is taken from the plastic material causing its temperature to decrease. Therefore no water film can be formed on the wire but new coolant constantly hits the wire. When continuing through the pipe 16, 16' the wire is cooled to such an extent that vapour is no longer formed but the cooling procedure continues due to the fact that the cold water mists absorbs heat. Because the wire does not run in a water bath the air jets are capable of blowing off water particles all the time from the wire surface and provide new particles with low temperature. When the cooled wire has passed through the whole cooling arrangement 15 it proceeds to a traction device 26 and is finally wound on a coil 27.

Figure 2:
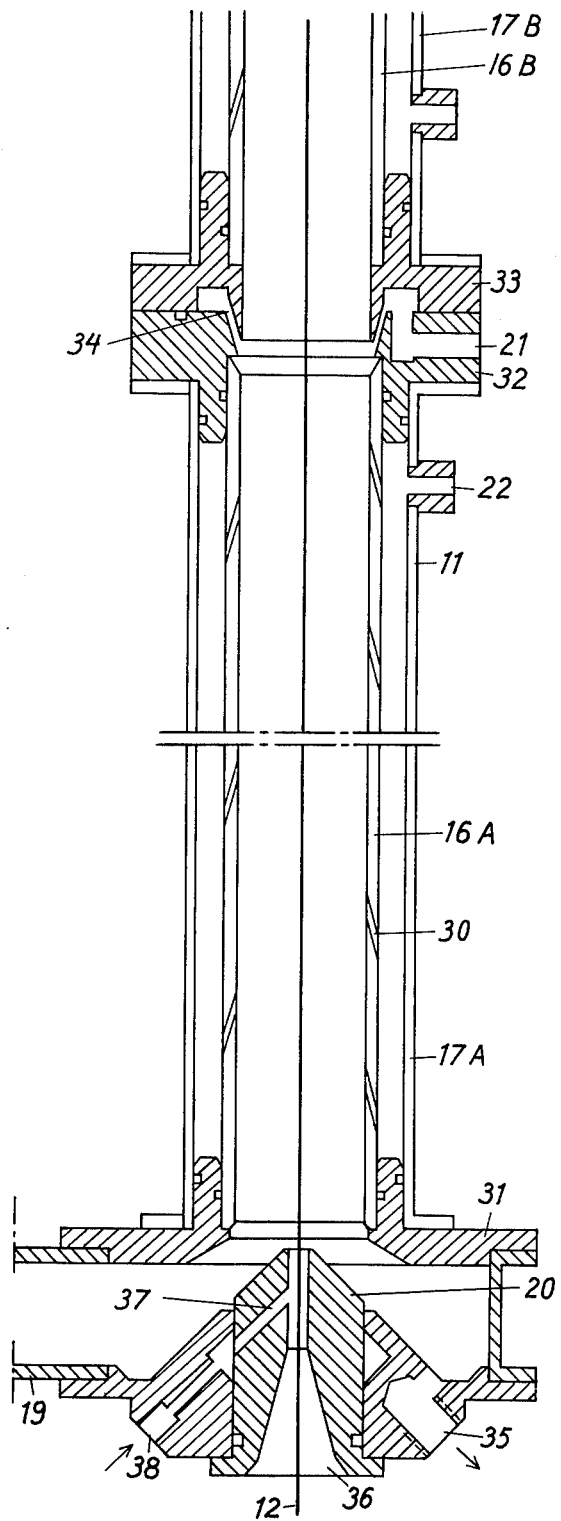
FIG. 2 shows a detail of a cooling pipe.

The design of the cooling arrangement appears more in detail from FIG. 2. The pipes 16, 17 are here divided into sections 16A, 17A, 16B, 17B with separate water- and air inlets. Thus it is possible to control the degree of cooling along the wire in a desired manner. Here the nozzles 30 have been shown directed obliquely to the direction of motion of the wire. When looked upon in a plane perpendicularly to the axis of the pipe the nozzles can be directed radially or tangentially depending on the desired type of circulation of the water mist. In one embodiment the nozzles are 0.4 mm holes drilled in the wall of the inner pipe. The holes were drilled in the same direction as the direction of motion of the wire, i.e., upwards in the pipe 16 and downwards in the pipe 16' of FIG. 1 and tangentially to the inner sheath surface of the inner pipe. As the holes 30 form a discontinuity at the inner surface of the pipe 16, 16' the expansion of the compressed air is adiabatic. The temperature of the air at the mouth of the holes 30 is in practice below 0° C. The tangential component of the direction of the holes 30 will cause the expanding air to rotate helically around the wire and support the removal of heat from the wire.

The lower pipes 16A, 17A are on their lower parts provided with a flange 31 by means of which it is connected to the sump 19. The upper end is also provided with a flange 32 comprising the water inlet 21. The flange 32 is connected to a corresponding flange placed on the lower part of the pipes 16B, 17B, for example by means of a number of screws (not shown) arranged around the flange. A ring-shaped slot 34 being tangentially directed downwards is arranged in the flanges 32, 33 and this slot is connected to the water inlet 21. In this manner the flowing water will be directed downwards along the wall of the pipe 16A and it will trickle along this wall in a thin layer. When the water stream passes the nozzles 30 it is atomized to the water mist earlier described. Superfluous water trickles into the sump 19 which is provided with a draining outlet 35. In order to prevent the water from trickling down the wire 12 through the guides 36 on the inlet- and outlet side these are provided with nozzles 37 directed towards the pipe 16A. These nozzles 37 are connected to a compressed air inlet 38 and blow an air jet upwards along the conductor 12. In this way water is prevented from trickling down towards the extruder head 14 and on the side of the outlet water is prevented from following the wire out of the cooling arrangement and consequently no special drying means are required.

When starting an extruder line with a cooling arrangement according to this invention it is easy to have the starting end of the wire pulled out to the traction device 26. The guides 36 at the inlet- and outlet sides are to be temporarily removed and a plastic ball with an attached leader, for instance, is put into the pipe. By feeding compressed air to the nozzles 30 the body is blown through the cooling arrangement. By means of the leader it is easy to draw the starting end of the conducting wire to the traction device 26.

Figure 3:
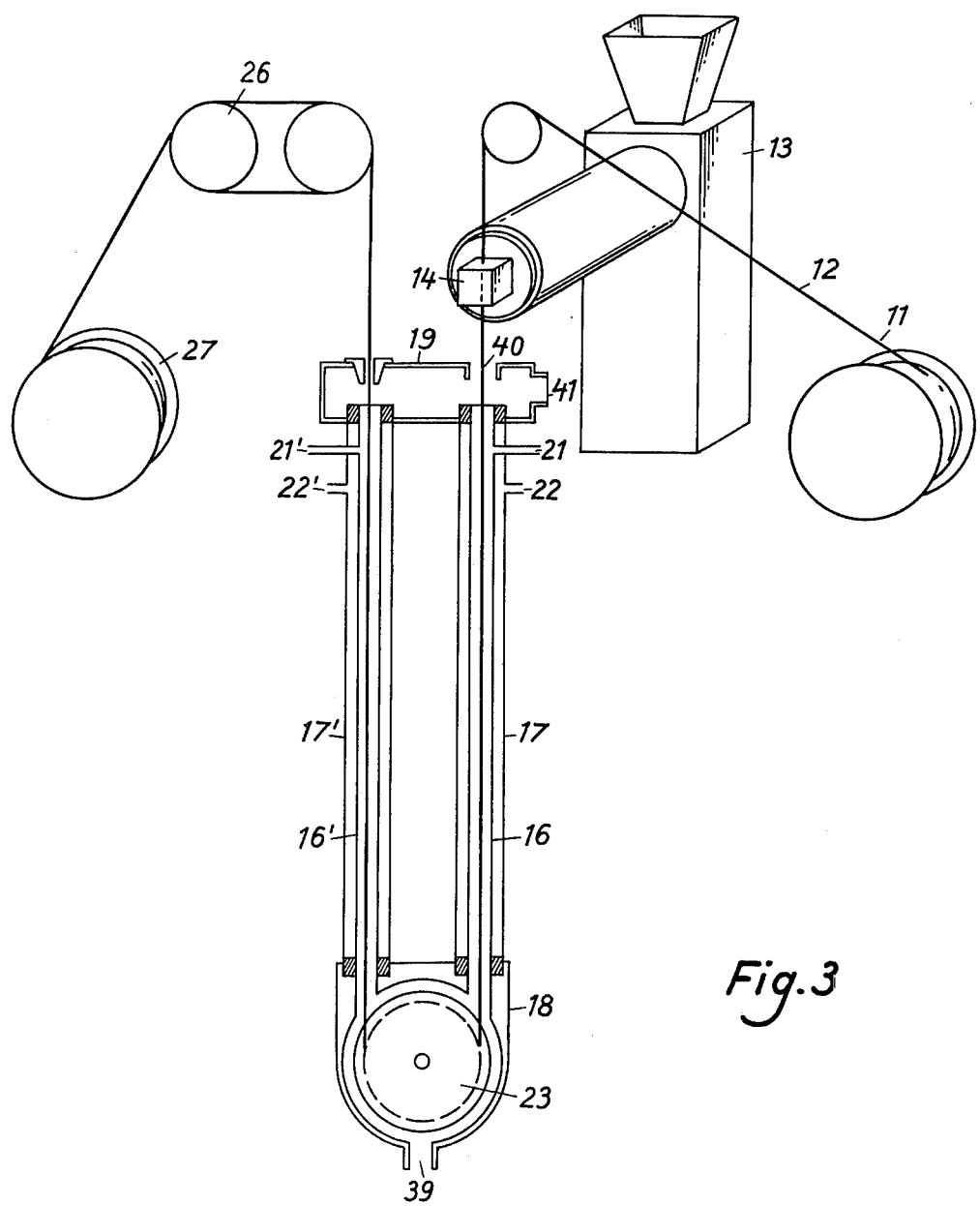
FIG. 3 shows a modification of the plant shown in FIG. 1.

The arrangement shown in FIG. 1 mainly extends vertically upwards in relation to the floor plane where the extruder is placed. This embodiment is especially appropriate for one-storeyed factory premises. Of course it is also possible to let the cooling arrangement extend vertically downwards which may be convenient when there is or easily may be arranged enough space under the premises where the rest of the machinery is placed. Such a cooling arrangement is shown in principle in FIG. 3.

The pipes 16, 17 are shaped in the same way as has been shown in FIG. 2 having nozzles directed along the wire 12. The housing 18 of the pulley 23 is here placed at the very bottom of the cooling arrangement and is provided with a draining pipe 39. It is not necessary to provide the sump 19 with a guide 36 near the wire inlet 40 as shown in FIG. 2, as in this case, there is no risk of water sprinkling of the extruder head 14 which is placed above the cooling arrangement. The outlet, however, is provided with a guide 36' in order to keep the wire dry when leaving the cooling arrangement. Also in this case the sump 19 is provided with a vent 41 open to the atmosphere.

The shown embodiments merely serve the purpose of illustrating the invention which of course can be varied in a number of ways within the scope of invention such as defined by the appended claims.

We claim:

1. Apparatus for continuously cooling a wire-shaped object comprising a vertically extending first pipe, means for guiding the object coaxially through said first pipe, liquid feeding means for feeding liquid coolant onto the inner surface of the wall of said first pipe, said feeding means being near the top of said first pipe whereby the coolant can flow down the inner wall of said first pipe, a plurality of openings in the wall of said first pipe, a second pipe coaxially surrounding said first pipe, means for sealing the ends of said second pipe to said first pipe to provide a manifold, gas feeding means connected to said second pipe for feeding a gas under pressure to the manifold whereby jets of the gas can pass through the openings in said first pipe to vaporize and propel the coolant to form a mist around the object.

2. The apparatus according to claim 1 wherein the flow of the coolant, the dimensions of the openings and the pressure of the gas are chosen in such a way that the mist has a temperature near the freezing point of the coolant due to the cooling caused by the expansion of the gas when entering the region within the first pipe.

3. Apparatus according to claim 1, wherein the openings are directed in such a way that the jets form an angle to the direction of motion of the object.

4. Apparatus according to claim 1, wherein the pipes are folded to form a U-shaped configuration so that the inlets and outlets of the pipes are located generally in the same level.

5. Apparatus according to claim 4 further comprising a pulley means for guiding the object, said pulley means being at the fold of the pipes.

6. Apparatus according to claim 4 wherein the inlet and outlet of the first pipe are placed vertically displaced from the region of the fold.

7. Apparatus according to claim 6 wherein the inlets and outlet of the first pipe are located below the region of the fold.

8. Apparatus according to claim 1, further comprising a guider for guiding the object into the inner pipe, said guider including means for directing a gas jet along the object towards the first pipe to prevent coolant from escaping along the object.

9. Apparatus according to claim 1 wherein said feeding means feeds coolant at several points along the first pipe.

* * * * *